United States Patent [19]

Honda et al.

[11] Patent Number: 4,993,102
[45] Date of Patent: Feb. 19, 1991

[54] VARIABLE-DRIVING UNIT FOR WIPERS AND A WIPER DEVICE INCORPORATING THE SAME

[75] Inventors: Yukio Honda, Kosai; Mikihiro Kondoh, Okazaki; Hiroshi Takahashi, Aichi, all of Japan

[73] Assignee: Asmo Co., Ltd., Kosai, Japan

[21] Appl. No.: 239,746

[22] Filed: Sep. 2, 1988

[30] Foreign Application Priority Data

| Sep. 3, 1987 | [JP] | Japan | 62-133885[U] |
| Nov. 19, 1987 | [JP] | Japan | 62-290475 |
| Jul. 18, 1988 | [JP] | Japan | 63-93943 |

[51] Int. Cl.⁵ .............................................. B60S 1/34
[52] U.S. Cl. .............................. 15/250.20; 15/250.13; 15/250.34
[58] Field of Search ........... 15/250.13, 250.15, 250.19, 15/250.20, 250.27, 250.29, 250.30, 250.31, 250.34, 250.35

[56] References Cited

U.S. PATENT DOCUMENTS

| 4,370,774 | 2/1983 | Bienert et al. | 15/250.20 |
| 4,472,854 | 9/1984 | Bauer et al. | 15/250.34 |
| 4,698,872 | 10/1987 | Watanabe | 15/250.20 |
| 4,718,139 | 1/1988 | Okuda et al. | 15/250.35 |

FOREIGN PATENT DOCUMENTS

| 3314456 | 10/1984 | Fed. Rep. of Germany | 15/250.20 |
| 3523546 | 10/1986 | Fed. Rep. of Germany | 15/250.20 |
| 160637 | 12/1980 | Japan | 15/250.20 |
| 138450 | 8/1982 | Japan | 15/250.20 |
| 58-93652 | 6/1983 | Japan . | |
| 59-145647 | 8/1984 | Japan . | |
| 62-30535 | 8/1987 | Japan . | |
| 826115 | 12/1959 | United Kingdom | 15/250.19 |
| 897530 | 5/1962 | United Kingdom | 15/250.20 |

Primary Examiner—Harvey C. Hornsby
Assistant Examiner—Mark Spisich
Attorney, Agent, or Firm—Burns, Doane, Swecker & Mathis

[57] ABSTRACT

An automobile wiper device includes a variable-driving unit capable of adjustably changing at least one of the arm pressure and the wiping area of the wiper device.

3 Claims, 10 Drawing Sheets

| Step | Wiper Swich (OFF/INT/LoHi) PA0 | Vechicle Speed Sensor PA1 | Cam Plate | | | Motor Control Signal | | Motor Rotation | Arm Pressure |
|---|---|---|---|---|---|---|---|---|---|
| | | | PB0 | PB1 | PB2 | PC0 | PC1 | | |
| 1 | 0 | ✕ | 1 | 0 | 0 | 1 | 1 | Stop | Low |
| 2 | 1 | 0 | 1 | 0 | 0 | 1 | 0 | Forward | → |
| 3 | 1 | 0 | 1 | 1 | 0 | 1 | 0 | " | |
| 4 | 1 | 0 | 0 | 1 | 0 | 1 | 1 | Stop | Normal |
| 5 | 1 | 1 | 0 | 1 | 0 | 1 | 0 | Forward | → |
| 6 | 1 | 1 | 0 | 1 | 1 | 1 | 0 | " | |
| 7 | 1 | 1 | 1 | 1 | 1 | 1 | 0 | " | |
| 8 | 1 | 1 | 1 | 0 | 1 | 1 | 1 | Stop | High |
| 9 | 1 | 0 | 1 | 0 | 1 | 0 | 1 | Reverse | → |
| 10 | 1 | 0 | 1 | 1 | 1 | 0 | 1 | " | |
| 11 | 1 | 0 | 0 | 1 | 1 | 1 | 1 | Stop | Normal |
| 12 | 0 | ✕ | 0 | 1 | 1 | 0 | 1 | Reverse | → |
| 13 | 0 | ✕ | 0 | 1 | 0 | 0 | 1 | " | |
| 14 | 0 | ✕ | 1 | 1 | 0 | 0 | 1 | " | |
| 1 | 0 | ✕ | 1 | 0 | 0 | 1 | 1 | Stop | Low |

VARIABLE-DRIVING UNIT FOR WIPERS AND A WIPER DEVICE INCORPORATING THE SAME

BACKGROUND OF THE INVENTION

1. Field of the Invention

The present invention relates generally to automobile wiper devices, and more particularly to a variable-driving unit capable of varying the arm pressure and the wiping area of a wiper device, and also to a wiper device incorporating such variable-driving unit.

2. Description of the Prior Art

An automobile wiper device includes a wiper arm driven to oscillate through a segmental or fan-shaped area. The wiper arm is firmly connected at its proximal end to a pivot spindle fixed to one end of a pivot lever pivotally connected at the other end thereof to one end of a link rod, the other end of the link rod being pivoted to a wiper motor. Upon rotation of the wiper motor, the link rod is reciprocated to oscillate the pivot lever and the pivot spindle connected thereto, thereby oscillating the wiper arm. The wiper arm is provided with a wiper blade connected to the distal end thereof for wiping a segmental area on a windscreen to remove raindrops or the like. During oscillating movement, the wiper blade is urged against the windscreen at a predetermined arm pressure by means of an arm spring associated with the wiper arm.

The arm pressure and the wiping area of the conventional wiper device are constant and not adjustable.

It is preferred to maintain the arm pressure at a minimum value while the wiper device is not operated, thereby preventing permanent deformation of the wiper blade. Such minimum arm pressure is not preferable when the vehicle is travelling at high speeds in which instance the wiper blade is subjected to a severe wind pressure tending to lift the wiper blade up from the windscreen against the force of the arm spring, resulting in a substantial reduction of wiping efficiency of the wiper device. This lifting of the wiper blade does not occur when the arm pressure is increased to a certain extent. However, the increased or high arm, pressure tends to permanently deform the wiper blade while the latter is being pressed against the windscreen.

As stated above, the wiper blade of the conventional wiper device is oscillated within a predetermined wiping area and this wiping area cannot be changed. This construction is disadvantageous in that the wiper device is likely to be damaged under severe wiping loads acting on the wiper blade and the wiper arm when the wiper blade changes its direction of oscillating movement while the wiper device is operating to wipe the snow on the windscreen. Furthermore, the wiper blade while oscillating is diplaced laterally outwardly from the predetermined wiping area under a severe window pressure acting on the windscreen when the vehicle is travelling at high speeds. The wiper blade thus displaced tends to slip off the windscreen in a lateral outward direction and damage the vehicle body.

One prior attempt made to overcome the foregoing difficulties caused by the constant arm pressure is disclosed in Japanese Patent Laid-open Publication No. 59-145647 in which an electromagnetic clutch is employed to change the arm pressure. The electromagnetic clutch, however, is difficult to control at an accurate operation timing which is required for spontaneous control of operation of the wiper device. Wiper device having such electromagnetic clutch is complicated in construction and large in size.

SUMMARY OF THE INVENTION

It is accordingly an object of the present invention to provide an automobile wiper device incorporating a variable-driving unit which is capable of changing the wiper arm pressure and the wiping area.

Another object of the present invention is to provide a variable-driving unit for a wiper device, which unit is operative to vary at least one of the wiper arm pressure and the wiping area automatically in response to a change in vehicle speed or upon actuation of a manual switch.

A further object of the present invention is to provide a wiper device incorporating the aforesaid variable-driving unit for adjustably varying the arm pressure.

A still further object of the present invention is to provide a wiper device incorporating the aforesaid variable-driving unit for adjustably changing the wiping area.

According to a first aspect of the present invention, there is provided a variable-driving unit for adjustably changing the operation of an automobile wiper device, comprising: an adjustment motor; a stopper driven by the adjustment motor; an adjustment element held in engagement with an engagement projection driven by the stopper; and a control unit operatively connected with the adjustment motor for controlling operation of the stopper to thereby actuate the adjustment element.

The variable-driving unit is simple in construction, small in size, easy to assemble and suitable for an automatized remote control of adjustment of the operation of the wiper device.

According to a second aspect of the present invention, there is provided an automobile wiper device of the type which includes a pivot spindle rotatably mounted in a pivot holder secured to a vehicle body, a wiper arm connected at opposite ends with the pivot spindle and with a retainer supporting a wiper blade, and an arm spring connected at one of its opposite ends with the retainer, wherein the improvement comprises: an adjustment lever pivotally connected with the wiper arm and having an end connected to the other end of the arm spring; a cylindrical engagement element rotatably mounted around the pivot holder and having a longitudinal axis which is eccentric to the axis of the pivot holder, the engagement element being held in engagement with an opposite end of the adjustment lever; and a variable-driving unit for turnig the cylindrical engagement element for displacing said one end of the adjustment lever, thereby changing the effective length of and hence the force of the arm spring. The adjustment lever may include a semispherical element pivotally supported on the other end of the adjustment lever and engageable with the engagement element. With this construction, the adjustment lever is kept aligned with the direction of force of the arm spring. Further, the adjustment lever and the engagement element are free from abrasive wear and do not produce an unpleasant noise.

Thus, the variable-driving unit serves as a wiper arm pressure adjustment unit. The variable-driving unit actuates the adjustment lever to change the effective length and hence the force of the arm spring. While the wiper device is not operated, the arm pressure is held at a minimum value to thereby prevent the wiper blade from being permanently deformed. The wiper device thus constructed is durable as a whole.

According to a third aspect of the present invention, there is provided an automobile wiper device of the type which includes a reciprocating link rod connected at opposite ends with a wiper motor and with a pivot lever for converting a rotary motion of the wiper motor into oscillating movement of the pivot lever, wherein the improvement comprises: a variable-driving unit for displacing the pivot lever to vary a wiping area of the wiper device, the variable-driving unit including an adjustment motor, a stopper driven by the adjustment motor, an engagement element engageable with the stopper, a first adjustment member engageable with the engagement element, a second adjustment member engageable with the first engagement member, and a control unit for controlling the operation of the adjustment motor for actuating the second adjustment member via the first adjustment member to displace the pivot lever, thereby changing the wiping area of the wiper device.

The wiper device having a variable wiping area can be provided only with a slight modification to the variable-driving unit according to the first aspect. With this variable wiping area, the wiper is prevented from overrunning when the vehicle is travelling at high speeds. It is also possible to protect the wiper motor from overheating or being damaged when the vehicle is travelling a snowy district while the wiper device is in operation to wipe snow off the windscreen.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

FIGS. 1 through 9 inclusive show an automobile wiper device incorporating a variable driving unit S according to the present invention. The variable-driving unit S is so constructed as to vary the wiper arm pressure and hence serves as a wiper arm pressure adjustment unit.

Figure 1:
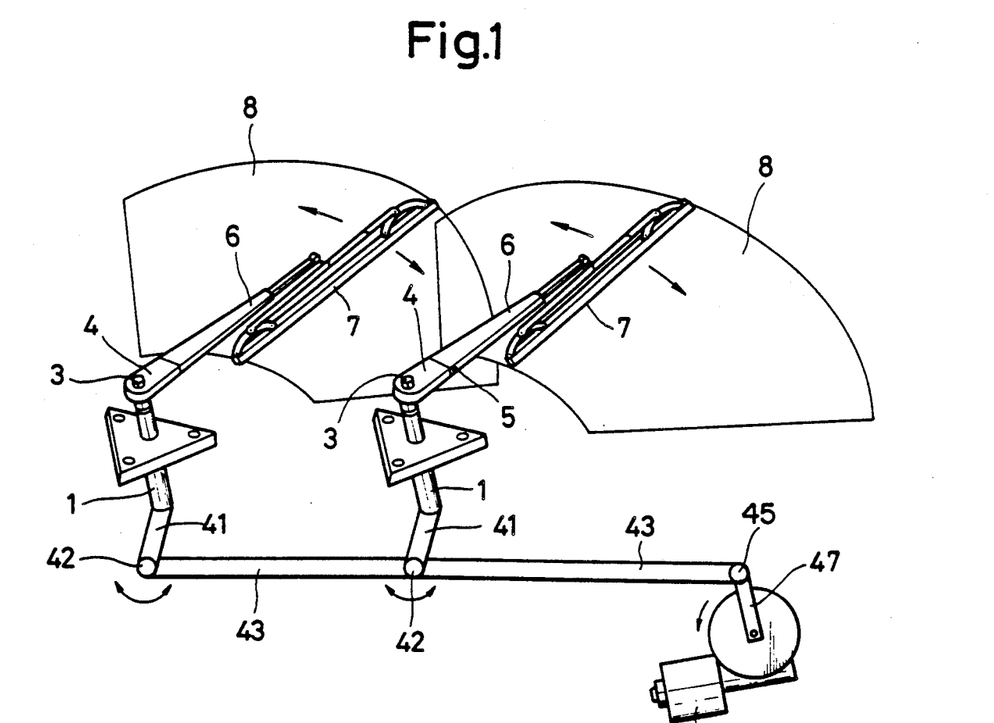
FIG. 1 is a diagrammatical view showing the general construction of a wiper device according to the present invention.
Figure 2:
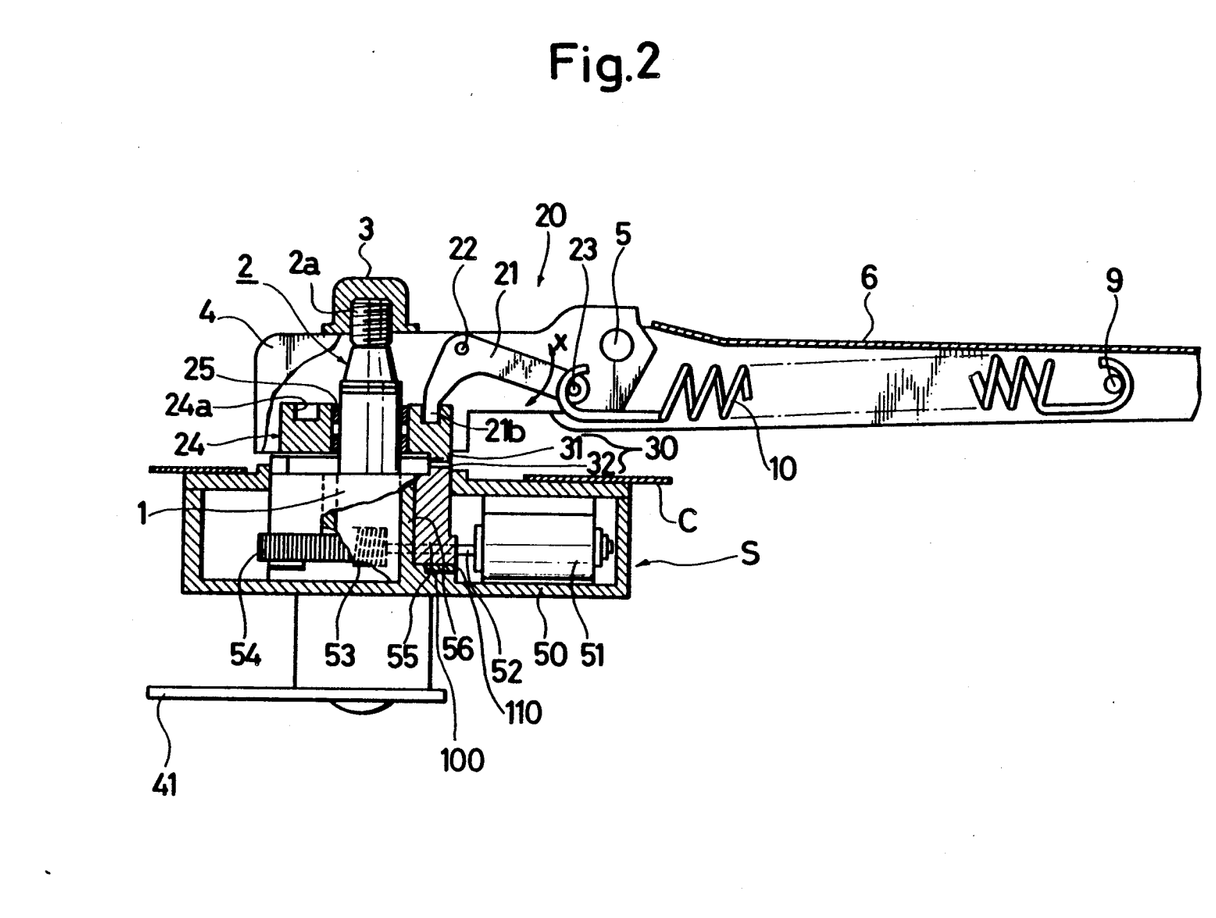
FIG. 2 is a longitudinal cross-sectional view of a wiper arm oscillating mechanism and an arm pressure adjustment unit of the wiper device.

The wiper device includes, as shown in FIG. 2, a pivot holder 1 firmly connected to a body C of a motor vehicle, and a pivot spindle 2 rotatably mounted in the pivot holder 1. The pivot spindle 2 has an externally threaded front end 2a to which the proximal end of a wiper arm 4 is secured by a nut 3. The distal end of the wiper arm 4 is pivotally connected by a pivot shaft 5 to the proximal end of a retainer 6 so that the retainer 6 is pivotally movable about the pivot shaft 5 toward and away from a windscreen 8 (FIG. 1) of the motor vehicle. The retainer 6 is generally channel shaped and includes a retainer pin 9 disposed at a portion of the retainer 6 remote from the proximal end thereof and projecting transversely into a longitudinal groove in the channel-shaped retainer 6. The distal end of the retainer 6 is connected to a wiper blade 7 for wiping the outer surface of the windscreen 8, as shown in FIG. 1. The pivot spindle 2 is rotatably supported by a sleeve bearing 56 of a housing 50 (FIG. 2) integrally formed with the pivot holder 1. The pivot spindle 2 has a rear end connected to one end of a pivot lever 41, the other end of the pivot lever 41 being pivotally connected by a pivot pin 42 to a link rod 43. The link rod 43 is pivoted by a pivot pin 45 to a crank 47 driven by a wiper motor 46. The retainer pin 9 is connected to one end of an arm spring 10, the other end of the arm spring being connected to an arm pressure adjustment mechanism 20 of the variable-driving unit S. The arm spring 10 thus arranged serves to urge the wiper blade 7 against the windscreen 8.

As shown in FIG. 2, the arm pressure adjustment mechanism 20 includes an adjustment lever 21, an engagement element comprising a tubular member 24, and a lock mechanism 30 composed of a trigger 31 and a stopper 32. The adjustment lever 21 has a generally L-shape and is pivotally connected at its central bent portion to a side wall 4a (FIG. 3) of the wiper arm 4 by means of a pivot shaft 22. The L-shaped adjustment lever 21 has an oblong hole 21a extending longitudinally along one end portion of the adjustment arm 21. The wiper arm 4 has an elongate guide groove 4b extending transversely in the side wall 4a and loosely receiving therein a headed retaining pin 23. The retainer pin 23 is inserted into the guide groove 4b from the outer side of the wiper arm 4 and then extends through the oblong hole 21a. The retainer pin 23 is connected to the other end of the arm spring 10. The other end 21b of the L-shaped adjustment arm 21 is held in locking engagement with the tubular member 24 which serves as the engagement element as described later on.

Figure 4:
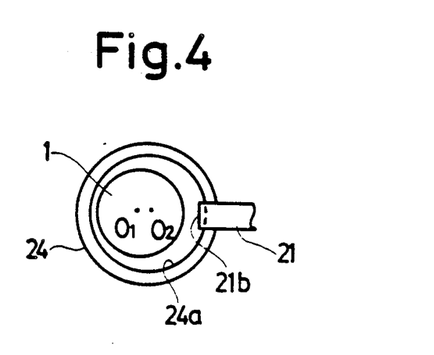
FIG. 4 is a schematic plan view showing the eccentric mounting of a tubular member relative to a pivot spindle.

The tubular member 24 is rotatably mounted on the pivot spindle 2 via sleeve bearings 25. The tubular member 24 has a concentric annular groove 24a formed in its upper end face. The annular groove 24a has a central axis O2 eccentric to the central axis O1 of the pivot spindle 2, as shown in FIG. 4. With this arrangement, when the tubular member 24 is turned relative to the pivot holder 1 or relative to the axis of the pivot spindle 2, the end 21b of the adjustment lever 21 slides relative to the tubular member 24 along the outer side wall of the annular groove 24a. Due to the eccentricity of the annular groove 24a, the angular movement of the tubular member 24 causes the adjustment lever 21 to pivotally move about the pivot shaft 22.

The trigger 31 comprises a projection disposed at a predetermined position on a lower end face of the tubular member 24. The stopper 32 is disposed in confronting relation to the trigger projection 31 for engagement and disengagement with the same.

The variable-driving unit S includes an adjustment motor 51 mounted in the housing 50. The adjustment motor 51 supports on its output shaft 52 a worm gear 53. The worm gear 53 is held in driving mesh with a worm wheel 54 integrally formed on an outer peripheral surface of a tubular rotary member 55 at a lower end thereof. The rotary member 55 is slidably fitted over the sleeve bearing 56 so that it is rotatable about the axis of the pivot spindle 2 as the worm wheel 54 is rotated by the worm gear 53. The stopper 32 is composed of a stepped upper end face of the tubular rotary member 55 and includes an interrupted annular recess extending circumferentially over a predetermined angular range. With this arrangement, when the adjustment motor 51 is driven to rotate the worm gear 53, the worm wheel 54 is caused to turn the rotary member 55 and the stopper 32 formed thereon about the axis of the rotary member 55 whereby one of opposite end walls of the stopper 32 bounding the opposite ends of the arcuate recess is brought into and out of interlocking engagement with the trigger projection 31 on the tubular member 24. Thus, the angular extent of the arcuate recess of the stopper 32 governs the angular extent of oscillation or stroke of the wiper arm 4.

Figure 7:
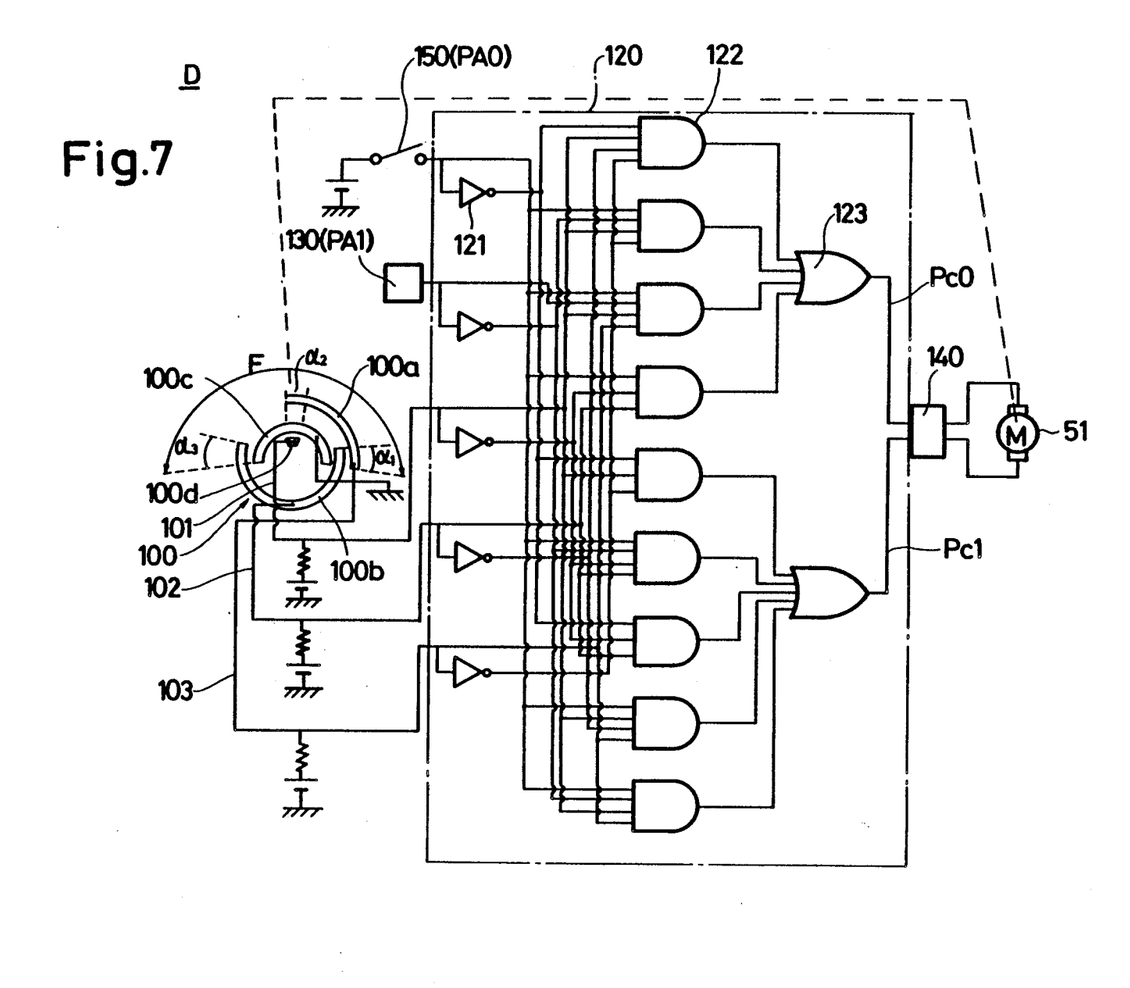
FIG. 7 is a circuit diagram of a control unit of the arm pressure adjustment unit.

The operation of the adjustment motor 51 is controlled by a control unit D shown in FIG. 7. The control unit D includes a conductive brush 110 disposed on the lower end face of the rotary member 55 adjacent to the worm wheel 54. The brush 110 has an outer end separated into a plurality (four in the illustrated embodiment) of aligned contacting tips 110a–110d. The contacting tips 110a–110d are slidingly engageable with a cam plate 100 provided on a circuit board disposed in the housing 50. The cam plate 100 includes four patterns or segments 100a–100d disposed concentrically to one another end extending circumferentially through respective predetermined angular distances. The patterns 100a–100d are connected with a logic control circuit of a microcomputer 120 via input lines 101, 102 and 103. More specifically, the patterns 100a, 100b and 100d are connected with the input lines 103, 102 and 101, respectively, and the pattern 100c is grounded. The rotary member 55 is turned by the adjustment motor 51 whereupon the brush 110 slides along the cam plate 100 to control operation of the adjustment motor 51. The brush 110 is movable through an angular range F. When the wiper device is kept inoperative or stopped, the operation of the adjustment motor 51 is stopped when the brush 110 is disposed in an angular range $\alpha 1$ of the cam plate 100, thereby setting the arm pressure at a minimum value (Low). When the arm pressure is to be set at a normal value, the operation of the adjustment motor 51 is stopped when the brush 110 is disposed in an angular gange $\alpha 2$ of the cam plate 100. Likewise, the operation of the adjustment motor 51 for setting the arm pressure at a maximum value is terminated when the brush 110 is disposed in an angular range $\alpha 3$ of the cam plate 100.

The control unit D further incldues a vehicle speed sensor 130 connected in circuit with the microcomputer 120 for delivering an output signal to the latter when the vehicle speed reaches to each of the preset values, as shown in the following TABLE.

TABLE

| Vehicle Speed | Arm Pressure | | |
|---|---|---|---|
| | Low | Normal | High |
| 0 Km/h | 7 grf/cm | | |
| <140 Km/h | | 14 grf/cm | |
| <240 Km/h | | | 28 grf/cm |

In response to the output signal received from the vehicle speed sensor 130, the micorcomputer 120 issues a control signal to a driver 140 to selectively stopping the operation of the adjustment motor 51 at one of the predetermined positions. The logic control circuit of the micorcomputer 120 is composed of arrays of NOT gates 121, AND gates 122 and OR gates, as shown in FIG. 7. The control unit D also includes a wiper switch 150 connected in circuit with the microcomputer 120.

Figure 8:
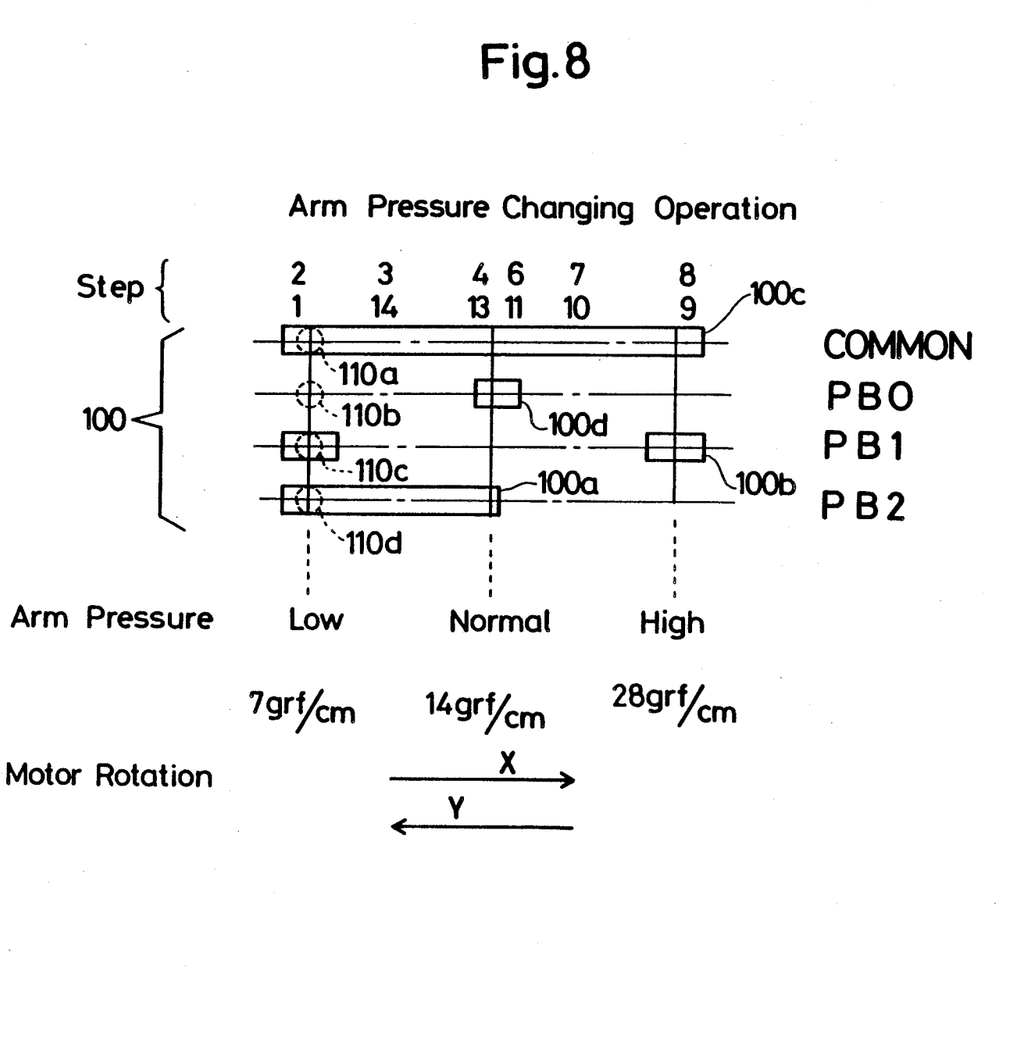
FIG. 8 is a diagrammatical view showing various modes of operation of the arm pressure adjustment unit.
Figure 9:
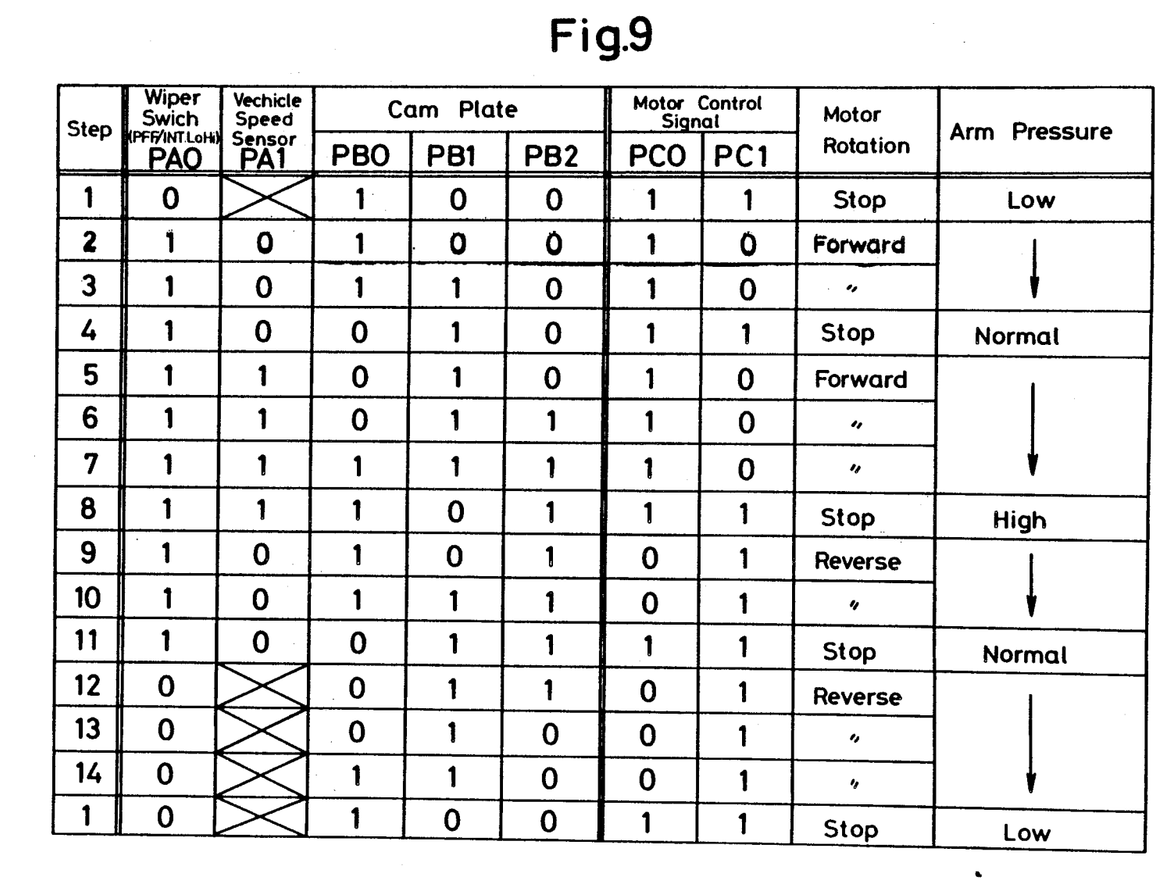
FIG. 9 is a truth table of various components of the control unit as they undertake various operational steps.

FIGS. 8 and 9 are views illustrative of the operation of the control unit D, in which FIG. 8 shows the position of the brush 110 relative to the cam plate 100, and FIG. 9 is a truth table of various components of the control unit D. In FIG. 8, the direction of arrow X indicates the forward rotation of the adjustment motor 51 while the direction of arrow Y indicates the reverse rotation of the adjustment motor 51. As shown in FIG. 9, the control unit D has a total of fourteen operation steps. In step 1, the wiper switch 150 (PA0) is turned off or opened in which instance the adjustment motor 51 is stopped at a position to keep the minimum arm pressure (Low). When the wiper switch 150 (PA0) is turned on or closed, the adjustment motor 51 is rotated in the forward direction X for changing the arm pressure from the minimum to the normal value in steps 2 and 3. The forward rotation of the adjustment motor 51 is terminated in step 4 to thereby enable the wiper device to operate at the normal arm pressure (Normal). When the vehicle speed exceeds the predetermined value such as 140 Km/h as shown in TABLE, the vehicle speed sensor 130 (PA1) delivers an output signal to the microcomputer 120 in step 5 whereupon the ajustment motor 51 is rotated again in the forward direction to increase the arm pressure of the wiper device. As the adjustment motor 51 continues its forward rotation in steps 6 and 7, the arm pressure is gradually increased. The forward rotation of the adjustment motor 51 is terminated in step 8 in which instance the wiper device is operating at the maximum arm pressure (High).

When the vehicle speed goes down below the predetermined value, i.e. 140 Km/h, the vehicle speed sensor 130 (PA1) delivers an output signal to the microcomputer 120 which in turn issues a control signal to rotate the adjustment motor 51 in the reverse direction to thereby reduce the arm pressure in steps 9 and 10. The reverse rotation of the adjustment motor 51 is stopped in step 11 in which instance the wiper device is operating at the normal arm pressure. When the wiper switch 150 (PA0) is turned off or opened, the adjustment motor 51 is rotated again in the reverse dirction to change the arm pressure from the normal to the low level in steps 12-14 whereupon the wiper devcie is stopped.

Figures 5, 6:
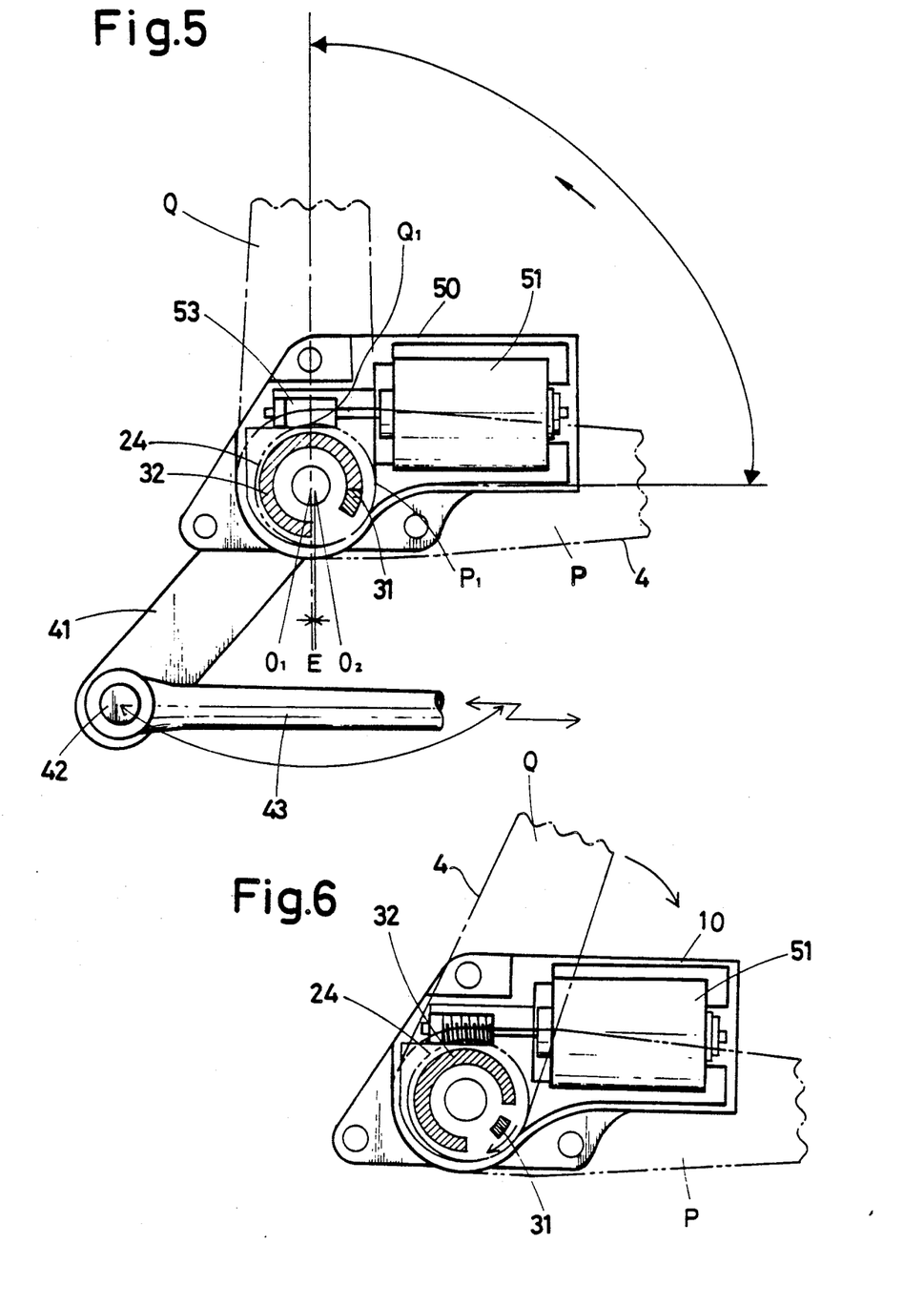
FIGS. 5 and 6 are fragmentary plan views illustrative of the operation of the arm pressure adjustment unit of the wiper device.

The foregoing operation of the control unit D is described further with reference to FIGS. 5 and 6. When the wiper switch 150 is closed or turned on, the logic control circuit of the microcomputer 120 operates to produce a control signal based on the detected vehicle speed as tabulated in the TABLE, for driving the adjustment motor 51 to change the arm pressure. The adjustment motor 51 thus driven causes the worm wheel 54 to be turned in one direction, thus movig the brush 110 to slide along the cam plate 100 from a first position in which the brush 110 is disposed in the angular range α1 to a second position in which the brush 110 is disposed in the angular range α2. When the brush 110 arrives at the second position, the operation of the adjustment motor 51 is stopped. At the same time, the stopper 32 on the rotary member 55 engages the trigger projection 31 on the eccentric tubular member 24 to thereby prevent the tubular member 24 from rotating in one direction (counterclockwise direction in FIG. 5).

As the wiper arm 4 is oscillating, the tubular member 24 is locked in position against displacement while the wiper arm 4 moves counterclockwsie from a substantially horizontal position indicated by dash-and-two dotted lines in FIG. 5 and denoted by P in the same figure to a substantially vertical position indicated by dash-and-dotted lines in FIG. 5 and denoted by Q in the same figure. With this angular movement of the wiper arm 4, the end 21b of the adjustment lever 21 slides along the annular groove 24a in the tubular member 24 from the horizontal position indicated by P1 to the vertical position indicated by Q1. Thus sliding movement of the end 21b causes the adjustment lever 21 to be turned about the pivot shaft 22 in a direction indicated by the arrow X in FIG. 2 through an angular extent corresponding to the eccentricity E of the eccentric tubular element 24. With this pivotal movmement of the adjustment lever 21, the position of the retainer pin 23 is changed with the result that the effective length of the arm spring 10 is varied, resulting in a change in wiper arm pressure.

Then the wiper arm 4 is angularly moved back from the vertical position toward the horizontal position as shown in FIG. 6, the trigger projection 31 on the tubular member 24 is released from locking engagement with the stopper 32. The tubular member 24 is turned clockwise in unison with the wiper arm 4 as they are forced together under the force of the arm spring 10. Thereafter, the tubular member 24 and the wiper arm 4 oscillate in unison until the position of the stopper 32 is changed. Thus, the wiper device operates to wipe the windscreen at the normal arm pressure. When the vehicle speed exceed a predetermined value, the vehicle speed sensor 130 delivers a detection signal to the microcomputer 120 which in turn issues a control signal to drive the adjustment motor 51 again in the forward direction until the brush 110 is angularly moved to the angular gange α3 from the angular range α2, thereby increasing the arm pressure. When the vehicle speed goes down to the predetermined value, the vehicle speed sensor 130 issues a detection signal based on which the adjustment motor 51 is rotated in the reverse direction to move the brush 110 from the angular range α3 to the angular range α2. Thus the wiper arm pressure is changed from the high to the normal level. When the wiper switch 150 is turned off or opened, the adjustment motor 51 is rotated again in the reverse direction until the brush 110 is moved from the angular range α2 to the angular range α1. Consequently, the wiper arm pressure is lowered to the minimum level. In the illustrated embodiment, the arm pressure is variable stepwise between three levels, i.e. low, normal and high. It is possible according to the present invention to replace the combined brush-and-cam plate assembly 110, 100 with a potentiometer in which instance a stepless continuous adjustment of the arm pressure is obtained. As a further alternative, the vehicle speed sensor 130 may be replaced by a manual switch disposed in a suitable position in the vehicle passenger compartment for generating the command signal to control the operation of the adjustment motor 51.

As described above, the wiper arm pressure can be changed by adjusting the force of the arm spring 10 by controlling the operation of the adjustment motor 51.

Figure 10:
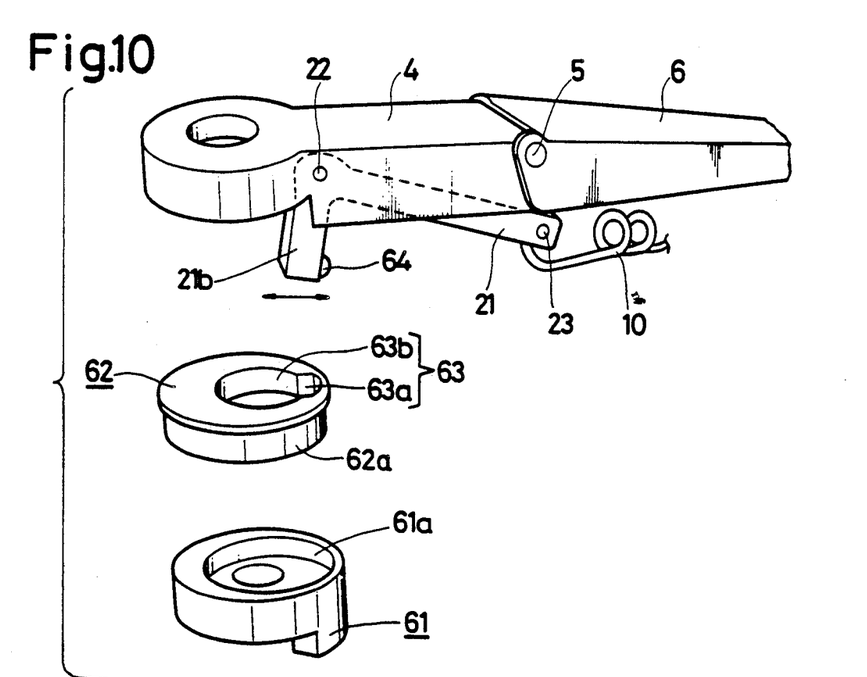
FIG. 10 is an exploded perspective view of a main portion of a modified arm pressure adjustment unit.

FIG. 10 shows a main portion of a modified variable-driving unit according to the present invention. Those parts which correspond to those shown in FIGS. 1 through 9 are denoted by corresponding reference characters.

The variable-driving unit serves as an arm pressure adjustment unit and includes an engagement element which is composed of an eccentric cylindrical busing 61 journaled on the pivot spindle 2 (FIG. 1) and a flanged cylindrical bushing 62 rotatably mounted on the eccentric bushing 61. The eccentric bushing 61 has in its upper end face a circular recess 61a which is eccentric to the axis of the pivot spindle 2. The flanged bushing 62 includes a concentric cylindrical shank 62a slidably received in the circular recess 61a, and a guide hole 63 formed in an upper end face of the bushing 62. The guide groove 63 is generally 8-shaped and composed of a circular recess 63b whose axis is offset from the axis of the pivot spindle 2, and a generally semicircular recess 63a extending radially outwardly from the offset side of the circular recess 63b which is remote from the axis of the pivot spindle 2. The variable-driving unit further includes an L-shaped adjustment lever 21 having a semispherical engagement projection 64 disposed on an inner surface of one arm adjacent to the distal end 21b thereof. In assembly, the flanged bushing 62 is rotatably mounted on the eccentric bushing 61, then the distal end 21b of the adjustment lever 21 is loosely received in the semicircular recess 63a of the guide hole 63. Since the semispherical projection 64 on the distal end 21b is slidably engageable with the peripheral wall of the semicircular recess 63a, the adjustment lever 21 is pivotably movable in response to the angular movement of the eccentric bushing 61 as described below. When the eccentric bushing 61 is turned relative to the pivot holder 1 (FIG. 1), the distal end 21b of the adjustment lever 21 while being received in the semicircular recess 63a turns relative to the eccentric bushing 61. Due to the eccentric arrangement of the circular recess 61a in the eccentric bushing 61, the angular movement of the distal end 21b causes the adjustment lever 21 to be pivoted about the pivot shaft 22 in the direction indicated by the arrow. Thus, the effective length of the arm spring 10 and hence the arm pressure can be adjusted. In this embodiment, the arm pressure adjustment is achieved by relative rotational movement of the eccentric bushing 61 and the flanged bushing 62 that are held in surface sliding contact with each other. The distal end 21b of the spring-biased adjustment lever 21 is received in the recess 63a and not slidable along the peripheral wall of the guide hole 63, so that both of the distal end 21b and the peripheral wall of the guide hole 63 are free from abrasive wear and they do not produce an unpleasant sliding noise. The veriable-driving unit is therefore durable as a whole.

Figure 11:
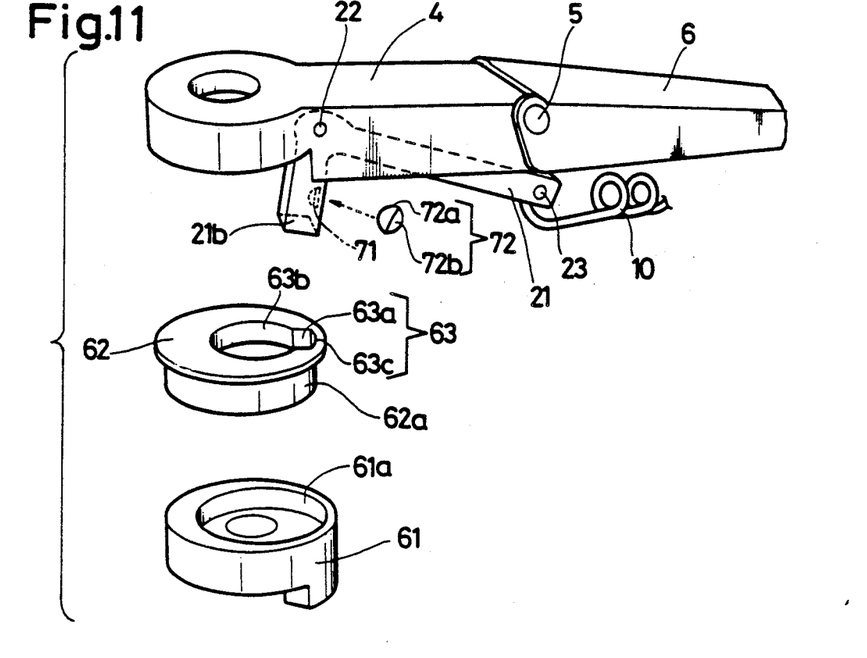
FIG. 11 is a view similar to FIG. 10, but showing another modified arm pressure adjustment unit.

FIG. 11 shows a main part of a modified variable-driving unit which is similar to the variable-driving unit shown in FIG. 10. With this structural similarity, those parts which correspond to those shown in FIG. 10 are denoted by corresponding reference characters. The variable-driving unit includes an L-shaped adjustment lever 21 having a semispherical recess 71 formed in an inner surface of one arm adjacent the distal end 21b thereof. The recess 71 slidably receives therein a round semispherical surface 72a of a semispherical element 72. The flat surface 72b of the spherical element 72 is disposed in confronting relation to the bottom wall 63c of a generally semicircular recess 63a in the flanged bushing 62 when the distal end 21b is received in the recess 63a. The flat surface 72b may be joined with the bottom wall 63c of the recess 63a.

Figure 12A:
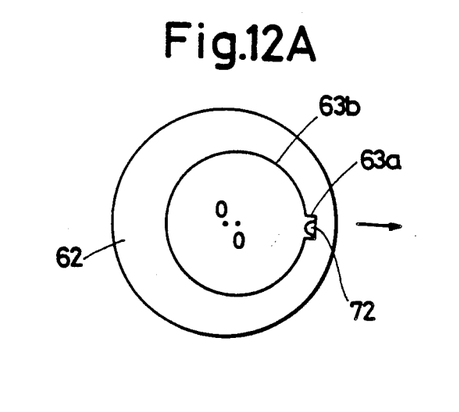
FIGS. 12A and 12B are schematic plan views illustrative of the operation of the arm pressure adjustment unit.
Figure 12B:
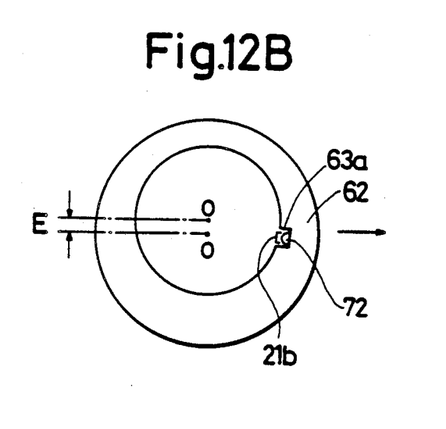

With this construction, when the flanged bushing 62 is turned relatively to the eccentric bushing 61 through an angle of 90 degrees from a position shown in FIG. 12A to a position shown in FIG. 12B, the bottom wall 63c of the recess 63a is tilted to an extent due to the eccentricity E of the circular recess 61a. In this instance, the semispherical recess 71 pivots about the complementary semispherical surface 72a of the semispherical element 72 to thereby accomodate the inclination of the bottom wall 63c. As a consequence, the adjustment lever 21 is always kept aligned with the direction of force of the arm spring 10 indicated by arrows in FIGS. 12A and 12B. Since the arm spring 10 urges the adjustment lever 21 to turn about the pivot shaft 22 in a direction to keep the distal end 21b including the semispherical element 72 of the ajustment lever 21 into continuous engagement with the botton wall 63c of the recess 63a, the flanged bushing 62 is held in frictional contact with the eccentric bushing 61 and slides along the circular recess 61a in the eccentric bushing 61 as the latter is turned. With the semispherical element 72 thus provided, there is no longer produced an unpleasant noise while the wiper device is in operation.

Figure 3:
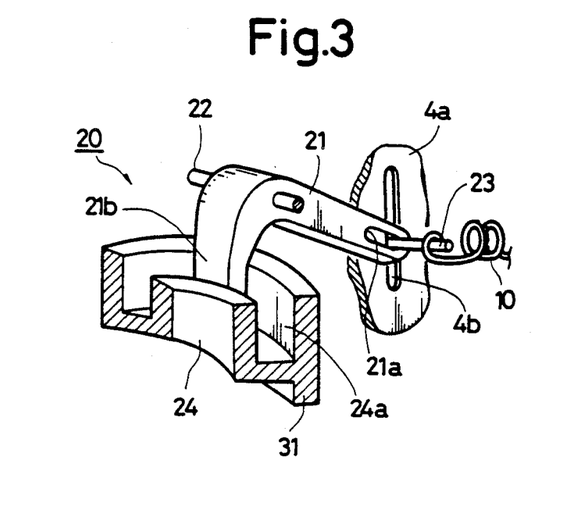
FIG. 3 is an enlarged perspective view of a main portion of the arm pressure adjustment unit.
Figure 13:
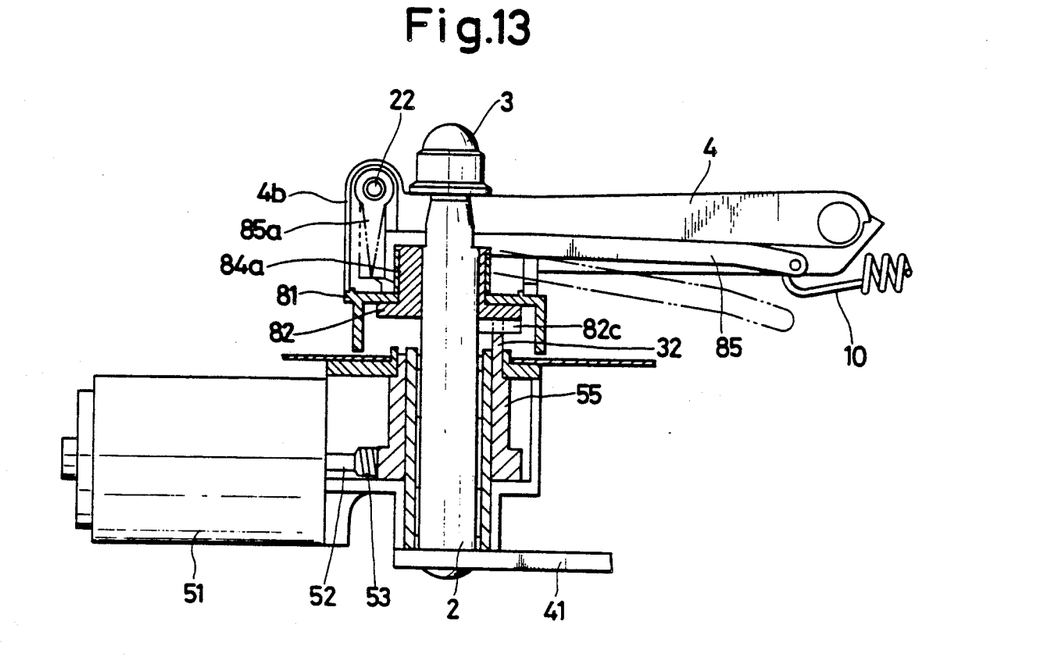
FIG. 13 is a side elevational view, with part in cross section, of a modified arm pressure adjustment unit according to the present invention.
Figures 14, 15:
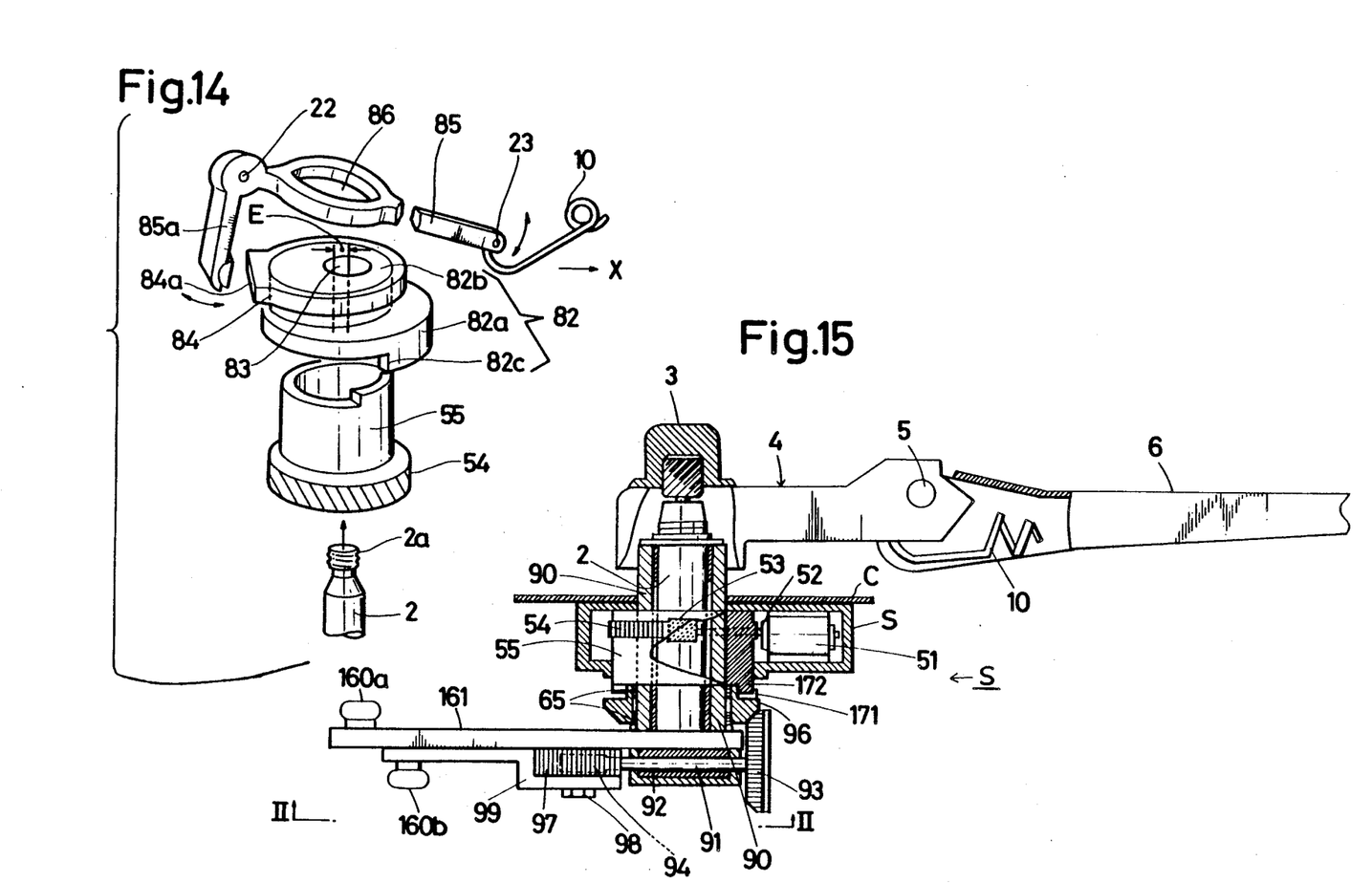
FIG. 14 is an exploded perspective view of a main portion of the arm pressure adjustment unit shown in FIG. 13.
FIG. 15 is a longitudinal cross-sectional view, with parts cut away for clarity, of a wiping area adjustment unit according to the present invention.

FIGS. 13 and 14 show another modified variable-driving unit according to the present invention. Those parts which corresponding to those shown in FIGS. 2 and 3 are denoted by corresponding reference characters. This embodiment differs from the predecing embodiments shown in FIGS. 2 and 3 in that one end of a pivotable adjustment lever is held in engagement with the outer peripheral wall of an engagement element.

The engagement element includes a head cover 81 secured to the proximal end 4b of a wiper arm 4, an eccentric bushing 82 rotatably mounted on the head cover 81, an actuating bushing 84 rotatably mounted on the eccentric bushing 82.

As shown in FIG. 14, the eccentric bushing 82 is composed of lower and upper circular tube mebers 82a, 82b integral with each other but eccentric to one another. The eccentric bushing 82 has an axial through-hole 83 for receiving a pivot spindle 2. The lower tube member 82a is concentric to the axis of the axial through-hole 83 while the upper tube member 82b is eccentric to the axis of the axial through-hole 83. The eccentric bushing 82 further has an arcuate trigger projection 82c disposed on a lower end face thereof and extending circumferentially along an outer peripheral edge portion of the lower tubular member 82a.

The actuating bushing 84 is in the form of a generally circular ring slidably fitted around the upper tube member 82b. The actuating bushing or ring 84 has on its outer periphery a flat abutment surface 84a which faces in a direction away from the arm spring 10.

A generally L-shaped adjustment lever 85 is pivoted by a pivot shaft 22 secured to a portion of a side wall of the wiper arm 4 which is disposed on a left side of the pivot spindle 2. One arm of the L-shaped adjustment lever 85 has a ring portion defining a circular opening 86 through which the pivot spindle 2 loosely extends. The other arm 85a of the adjustment lever 85 has a flat inner surface engageable with the flat abutment surface 84a of the actuating ring 84.

The arm spring 10 is connected by a retaining pin 23 to the arm of the adjustment lever 85 to urge the adjustment lever 85 to turn counterclockwise in FIG. 14, thereby urging the flat inner surface of the arm 85a into abutment with the flat abutment surface 84a of the actuating ring 84. With this arrangement, when the eccentric bushing 82 is turned about the axis of the pivot spindle 2, the actuating ring 84 turns around and relative to the upper tube member 82b until it is displaced in a direction which is either the same as or opposite to the direction of the arrow X in FIG. 14 to an extent corresponding to a variant of the eccentricity E of the upper tube member 82b. As a consequence, the adjustment lever 85 pivots about the pivot shaft 22 to a corresponding angular amount, thereby changing the position of the retaining pin 23 and hence the effective length of the arm spring 10. Thus, the arm pressure can adjustably be changed. Advantageously, the eccentric bushing or ring 82 is smaller in size than the one of each of the preceding embodiments and hence the variable-bushing unit is compact as a whole.

Figures 16, 17:
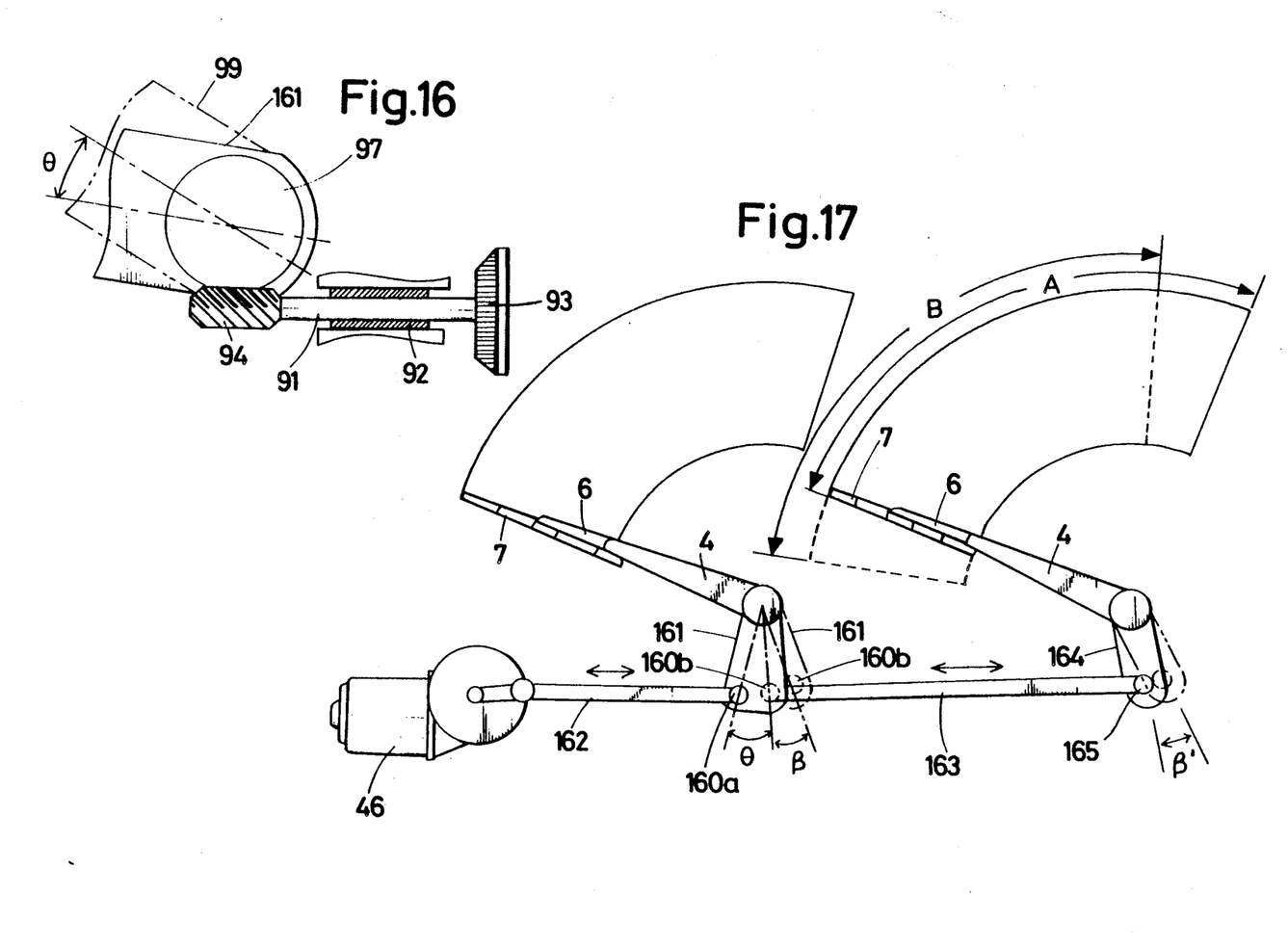
FIG. 16 is an enlarged bottom view of a portion of the wiping area adjustment unit, showing an adjustment lever and related components.
FIG. 17 is a diagrammatical view showing the general construction of a wiper device incorporating the wiping area adjustment unit.

FIGS. 15 through 17 inclusive show a modified wiper device according to the present invention. Those parts which correspond to those shown in FIGS. 1–4 are denoted by corresponding reference characters. The wiper device is provided with a variable-driving unit so constructed as to vary the wiping area of the wiper device. The wiper device is driven by a driving mechanism shown in FIGS. 1 and 2 and which includes a rotary shaft 91, a set of bevel gears 93, 96, a worm gear 94, a worm wheel 97, an adjustment lever 99 and a stopper 172.

The rotary shaft 91 is rotatably mounted on a pivot lever 161 via a sleeve bearing 92 and firmly connected at its opposite ends with the bevel gear 93 and with the worm gear 94. The bevel gear 93 is held in mesh with the bevel gear 96 rotatably mounted on a pivot holder 90 via sleeve bearings 65. The worm gear 94 is held in mesh with the worm wheel 97 rotatably mounted on a shaft (not shown) secured to the pivot lever 161. The pivot lever 161 has a first engagement pin 160a projecting from one end thereof remote from the other end to which a pivot spindle 2 is connected. The adjustment lever 99 has one end pivoted to the worm wheel 97 by a screw 98, the other end of the adjustment lever 99 is provided with a second engagement pin 160b projecting in a direction opposite to the first engagement pin 160a. The adjustment lever 99 underlies the pivot lever 161 and extends at an angle θ to the longitudinal central exis of the pivot lever 161. The angle θ is veriable when the adjustment lever 99 is oscillated about the screw 98 in response to turning of the worm wheel 97 driven by the worm gear 94.

The bevel gear 96 rotatably mounted on the pivot holder 90 includes an engagement projection 171 disposed on an upper end face thereof and engageable with the stopper 172 projecting downwardly from a lower end face of a rotary member 55. The rotary member 55 is driven by a variable-driving unit S secured to a vehicle body C, for bringing the stopper 172 into and out of interlocking engagement with the engagement projection 171, thereby releasably holding the bevel gear 96 in locking engagement with the pivot holder 90.

The variable-driving unit S includes a housing integral with the pivot holder 90 secured to the vehicle body C and an adjustment motor 51 mounted in the housing. The adjustment motor 51 has an output shaft 52 on which a worm gear 53 is secured for corotation therewith. The worm gear 53 is held in driving mesh with a worm wheel 54 formed integrally on and around the outer peripheral wall of the tubular rotary element 55. The rotary element 55 is rotatably mounted on the pivot holder 90 and has on its lower end face the above-mentioned projection or stopper 172. With this construction, when the adjustment motor 51 is driven to rotate the worm gear 53, the worm wheel 54 is driven to turn the rotary element 55 and the stopper 172. The stopper 172 thus driven is brought into and out of interlocking engagement with the engagement projection 171 on the bevel gear 96.

As shown in FIG. 17, the first engagement pin 160a on the pivot lever 161 is coupled with a wiper motor 46 via a first link rod 162, so that a rotary motion of the wiper motor 46 is translated into a reciprocating motion of the first link rod 162, thereby oscillating the pivot lever 161 about the axis of the pivot spindle 2 (FIG. 15). The second engagement pin 160b on the adjustment lever 99 is pivotally connected with one end of a second link rod 163, the other end of the second link lever 163 being pivoted by a pivot pin 165 to a pivot lever 164 which is secured to a pivot spindle (identical to the pivot spindle 2 shown in FIG. 15) of a wiper assembly on a driver's seat side. The driver's seat side wiper assembly is structually and functionally the same as the wiper assembly on an assistant driver's seat side stated above. The oscillating movement of the adjustment lever 99 is transmitted to the pivot lever 164 through the reciprocating movement of the second link rod 163.

With this construction, when the wiper motor 46 of the wiper device is driven, the first link rod 162 is reciprocated to oscillate the pivot lever 161 on the assistant driver's seat side, thus oscillating the pivot spindle 2 and the wiper arm 4 integral therewith about the axis of the pivot spindle 2. At the same time, the pivot lever 164 on the driver's seat side is oscillated by the wiper motor 46 through the adjustment lever 99 and the second link rod 163. As a result, the pivot spindle and the wiper arm 4 integral therewith is oscillated to wipe the driver's seat side of the windscreen in synchronism with the operation of the wiper arm 4 on the assistant driver's seat side. The stopper 172 is actuated under the control of a control unit which is similar to the control unit D shown in FIG. 7.

Operation of the wiper device of the foregoing construction is described below.

When the wiper arm 4 on the driver's seat side is operating for wiping a predetermined segmental area indicated by solid lines in FIG. 17 and extending over an angular range A, the bevel gear 96 is rotating freely relative to the pivot holder 90. Consequently, the worm wheel 97 is not rotated even when the rotary shaft 91 and the worm gear 94 are rotated. The adjustment lever 99 therefore remains immovable relative to the longitudinal axis of the pivot lever 161 and oscillates together with the pivot lever 161 while keeping the phantom-lined position in FIG. 15 in which the adjustment lever 99 extends at an angle 0 to the longitudinal axis of the pivot lever 161.

When the wiping area on the driver's seat side is to be changed, the adjustment motor 51 is operated based on the output signal from the vehicle speed sensor 130 (FIG. 7) or a non-illustrated manualy operable switch. Upon operation of the adjustment motor 51, the stopper 172 is angularly moved into engagement with the engagement projection 171 to thereby lock the bevel gear 96 against rotation around the pivot holder 90. The bevel gear 96 while being locked is rotatable relative to the pivot spindle 2 and the pivot lever 161, therefore, the bevel gear 93 is driven to rotate in response to oscillation of the pivot lever 161. As a result, the rotary shaft 91 and the worm gear 94 are rotated to thereby turn the worm wheel 97. Upon turning of the worm wheel 97, the adjustment lever 99 is angularly displaced relative to the axis of the pivot lever 161 from the normal position by an angle β as indicated by phantom lines in FIG. 17. With this relative displacement, the pivot lever 164 is angularly displaced by the angle β' from the solid-lined position to the phantom-lined position in FIG. 17, with the result that the wiper arm 4 is oscillated within an angular range B which is shifted toward the assistant driver's side by the angle β'. With this arrangement, it is ensured that the wiper blade 7 is prevented from overruning laterally off the windscreen while the vehicle is travelling at high speeds.

The wiping area of the wiper arm 4 may be displaced in the opposite direction in which instance the adjustment lever 161 is tilted in the opposite direction by properly operating the adjustment motor 51. This reverse displacement is particularly useful when wiping snow on the windscreen while vehicle is travelling in a snowy district because the wiping load acting on the wiper blade is substantially lowered.

In the illustrated embodiment, the wiping area of the wiper arm of the driver's seat side is changed. However, it is possible to change the wiping area of the wiper arm on the assistant driver's seat side by properly replacing the position of the related structural components.

Obviously, various modifications and variations of the present invention are possible in the light of the above teaching. It is therefore to be understood that within the scope of the appended claims the invention may be practiced otherwise than as specifically described.

What is claimed is:

1. An automobile wiper device comprising a pivot spindle rotatably mounted in a pivot holder secured to a vehicle body, a wiper arm connected at one end to the pivot spindle and connected at an opposite end to a retainer supporting a wiper blade, and an arm spring connected at one end with the retainer, wherein the wiper device further comprises:

an adjustment lever pivotally disposed on the wiper arm and having a spring end connected to an end of the arm spring that is opposite the retainer;

an eccentric bushing journaled on the pivot spindle and having a circular recess which is eccentric to a longitudinal axis of the pivot spindle;

a cylindrical actuating bushing slidably received in said circular recess of said eccentric bushing and rotatable relative to said eccentric bushing, said actuating bushing having an engagement portion for receiving an engagement end of said adjustment lever, said engagement end positioned opposite said spring end of said adjustment lever; and a variable-driving unit for rotating said eccentric bushing so as to displace said engagement portion of said actuating bushing and said engagement end of said adjustment lever according to said eccentrically disposed circular recess and thus adjust the effective length and hence the force of the arm spring.

2. An automobile wiper device according to claim 1, wherein said adjustment lever includes a hemispherical engagement projection pivotally supported on said engagement end of said adjustment lever and held in engagement with said engagement portion by the force of the arm spring.

3. An automobile wiper device according to claim 2, wherein said engagement portion has a recess for loosely receiving said hemispherical engagement projection.

* * * * *